United States Patent
Nguyen et al.

(10) Patent No.: US 12,195,642 B2
(45) Date of Patent: Jan. 14, 2025

(54) ANISOTROPIC CONDUCTIVE FILM AND METHOD AND COMPOSITION FOR MAKING THE SAME

(71) Applicant: MK HIGH TECHNOLOGY JOINT STOCK COMPANY, Vinh Phuc Province (VN)

(72) Inventors: Khang Trong Nguyen, Hanoi (VN); Thuat Tran Nguyen, Hanoi (VN)

(73) Assignee: MK HIGH TECHNOLOGY JOINT STOCK COMPANY, Vinh Puc Province (VN)

( * ) Notice: Subject to any disclaimer, the term of this patent is extended or adjusted under 35 U.S.C. 154(b) by 142 days.

(21) Appl. No.: 17/987,767

(22) Filed: Nov. 15, 2022

(65) Prior Publication Data

US 2023/0357580 A1 Nov. 9, 2023

(30) Foreign Application Priority Data

May 4, 2022 (VN) ............................... 1-2022-02799

(51) Int. Cl.
| | |
|---|---|
| C09D 5/24 | (2006.01) |
| C09D 7/20 | (2018.01) |
| C09D 7/40 | (2018.01) |
| C09D 7/65 | (2018.01) |
| C09D 123/08 | (2006.01) |
| C09D 133/12 | (2006.01) |

(52) U.S. Cl.
CPC ............. *C09D 5/24* (2013.01); *C09D 7/20* (2018.01); *C09D 7/65* (2018.01); *C09D 7/70* (2018.01); *C09D 123/0853* (2013.01); *C09D 133/12* (2013.01)

(58) Field of Classification Search
CPC ... C09D 5/24; C09D 7/20; C09D 7/65; C09D 7/70; C09D 123/0853; C09D 133/12
See application file for complete search history.

(56) References Cited

U.S. PATENT DOCUMENTS

| | | | |
|---|---|---|---|
| 6,194,492 B1 | 2/2001 | Sakurai et al. | |
| 6,344,156 B1 | 2/2002 | Yamada et al. | |
| 6,592,783 B2 | 7/2003 | Kumakura et al. | |
| 6,812,065 B1* | 11/2004 | Kitamura | C09J 9/02 |
| | | | 428/413 |
| 2009/0152505 A1* | 6/2009 | Jeon | C09J 123/0853 |
| | | | 525/190 |
| 2017/0162531 A1* | 6/2017 | Ko | H01B 1/20 |
| 2020/0308354 A1* | 10/2020 | Morita | C08J 5/18 |
| 2022/0223315 A1* | 7/2022 | Tanaka | H01B 1/22 |

\* cited by examiner

*Primary Examiner* — Mark Kopec
*Assistant Examiner* — Jaison P Thomas
(74) *Attorney, Agent, or Firm* — HSML P.C.

(57) ABSTRACT

A method for producing an anisotropic conductive film, which includes mixing a base polymer with an initiator and a first solvent to obtain a first mixture, dispersing conductive microspheres in an alcohol or a second solvent containing a surfactant to obtain a second mixture, mixing the first mixture with a monomer, a binder, and the second mixture to obtain a third mixture, and laminating the third mixture on a carrying film, followed by drying, so as to obtain the anisotropic conductive film. An anisotropic conductive film produced by the method and a composition for forming the anisotropic conductive film are also disclosed.

22 Claims, 2 Drawing Sheets

ANISOTROPIC CONDUCTIVE FILM AND METHOD AND COMPOSITION FOR MAKING THE SAME

CROSS-REFERENCE TO RELATED APPLICATION

This application claims priority of Vietnam Invention Patent Application No. 1-2022-02799, filed on May 4, 2022.

FIELD

The present disclosure relates to an anisotropic conductive film and a method of producing the same. The present disclosure also relates to a composition for forming the anisotropic conductive film.

BACKGROUND

An anisotropic conductive film (ACF) is usually made of a thin polymer layer (also known as a resin or a base polymer matrix) having spherical metal conductive particles or polymer core-metal shell particles dispersed randomly therein. With the development of the flexible electronic industry, involving products such as flat screens and wearable devices as well as smart cards, ACFs play an increasingly important role, being supported by the advantages of mutual electrical connections and mechanical adhesion.

ACFs have advantages such as compatibility with production environment, connectivity for small to very small electrodes, low production process temperature, simple production processes, and small product sizes and volumes, and hence can be used to connect chip on board (COB) for smart cards, chip on flex (COF) for radio frequency identification (RFID) tags, chip-on-glass (COG), flex on board (FOB) and flex on flex (FOF) circuits for handheld and wearable devices, and flex on glass (FOG).

U.S. Pat. No. 6,592,783 B2 discloses an anisotropic conductive adhesive film which contains a first insulating adhesive layer, a second insulating adhesive layer whose modulus of elasticity after curing is less than the modulus of elasticity of the cured first insulating adhesive layer, and electrically conductive particles which are dispersed in at least either the first insulating adhesive layer or the second insulating adhesive layer. The anisotropic conductive adhesive film can be used in electrical and mechanical connections between electronic components such as semiconductor chips and circuit boards, and are suitable for use when flip-chip mounting semiconductor chips on polyester-based flexible circuit boards.

U.S. Pat. No. 6,344,156 B1 discloses an anisotropic conductive adhesive film which contains conductive particles dispersed in an insulating binder. Each conductive particle consists of a styrene resin particle and a thin metal film formed on the surface thereof by gold-plating. Projections are formed on the surface of the thin metal film of the conductive particle. The anisotropic conductive adhesive film is capable of maintaining a high connection reliability on connection electrodes with a fine pitch on which an oxide film is formed, and hence can be used in, for example, electrically connecting a liquid crystal display (LCD) to a circuit board.

U.S. Pat. No. 6,194,492 B1 discloses an anisotropic conductive film which includes an adhesive and conductive particles dispersed in the adhesive. The adhesive is a thermosetting or photosetting adhesive containing at least one main component selected from the group consisting of a polymer obtained by acetalation of a polyvinyl alcohol, a compound containing an allyl group, a monomer containing an acryloxy group or methacryloxy group, and a polymer obtained by polymerization of at least one monomer selected from the group consisting of an acrylic monomer and a methacrylic monomer. The anisotropic conductive film is capable of exhibiting a conductivity only in the thickness direction thereof, and hence can be used to interpose between opposed circuits for connecting the circuits to each other through the conductive particles contained in the film and also adhesively bonding them to each other by pressurizing and heating the film interposed therebetween.

In spite of the aforesaid, there is still a need to provide a more efficient method for producing an anisotropic conductive film.

SUMMARY

Therefore, in a first aspect, the present disclosure provides a method for producing an anisotropic conductive film, which can alleviate at least one of the drawbacks of the prior art. The method includes:
(a) mixing a base polymer with an initiator and a first solvent, so as to obtain a first mixture;
(b) dispersing conductive microspheres, which are selected from the group consisting of polymer core-metal shell microspheres and solid metal microspheres, in an alcohol or a second solvent containing a surfactant, so as to obtain a second mixture;
(c) mixing the first mixture obtained in step (a) with a monomer, a binder, and the second mixture obtained in step (b), so as to obtain a third mixture; and
(d) laminating the third mixture on a carrying film, followed by drying, so as to obtain the anisotropic conductive film.

In in a second aspect, the present disclosure provides an anisotropic conductive film, which can alleviate at least one of the drawbacks of the prior art, and which is produced by the aforesaid method.

In a third aspect, the present disclosure provides a composition for forming an anisotropic conductive film, which can alleviate at least one of the drawbacks of the prior art. The composition includes:
a base polymer;
10 wt % to 35 wt % of a monomer;
5 wt % to 20 wt % of a binder;
1 wt % to 5 wt % of an initiator;
0.5 wt % to 5 wt % of a surfactant; and
1 wt % to 10 wt % of conductive microspheres, based on the total weight of the base polymer.

BRIEF DESCRIPTION OF THE DRAWINGS

The above and other objects, features and advantages of the present disclosure will become apparent with reference to the following detailed description and the exemplary embodiments taken in conjunction with the accompanying drawings, in which.

DETAILED DESCRIPTION

Figure 1:
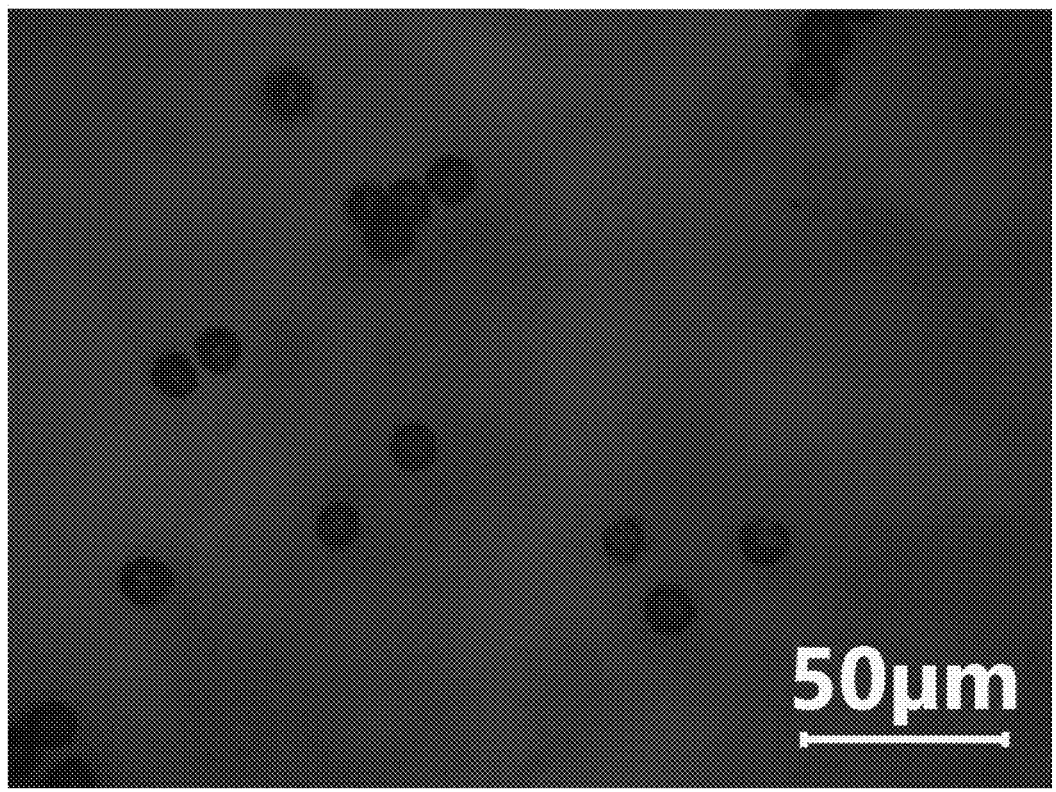
FIG. 1 shows the morphological observation result of the anisotropic conductive film of Example 19, infra.

It is to be understood that, if any prior art publication is referred to herein, such reference does not constitute an admission that the publication forms a part of the common general knowledge in the art, in Vietnam or any other country.

For the purpose of this specification, it will be clearly understood that the word "comprising" means "including but not limited to", and that the word "comprises" has a corresponding meaning.

Unless defined otherwise, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

The present disclosure provides a method for producing an anisotropic conductive film, which includes:
  (a) mixing a base polymer with an initiator and a first solvent, so as to obtain a first mixture;
  (b) dispersing conductive microspheres, which are selected from the group consisting of polymer core-metal shell microspheres and solid metal microspheres, in an alcohol or a second solvent containing a surfactant, so as to obtain a second mixture;
  (c) mixing the first mixture obtained in step (a) with a monomer, a binder, and the second mixture obtained in step (b), so as to obtain a third mixture; and
  (d) laminating the third mixture on a carrying film, followed by drying, so as to obtain the anisotropic conductive film.

According to the present disclosure, the base polymer may be selected from the group consisting of ethylene vinyl acetate (EVA), low density polyethylene (LDPE), high density polyethylene (HDPE), poly (methyl methacrylate) (PMMA), and combinations thereof.

According to the present disclosure, the initiator may be selected from the group consisting of potassium persulfate, benzoyl peroxide, azobisisobutyronitrile, 2,2'-azobis(2-methylbutyronitrile), dicumyl peroxide, di-tert-butyl peroxide, tert-butyl hydroperoxide, and combinations thereof.

According to the present disclosure, the surfactant may be selected from the group consisting of sodium dodecyl sulfate (SDS), Triton X-100, polyvinylpyrrolidone (PVP), dioctyl sodium sulfosuccinate (DSS), alkylbenzene sulfonates, nonoxynol-9, polysorbate, poloxamers, tergitol, antarox, and combinations thereof.

According to the present disclosure, the alcohol may be selected from the group consisting of ethanol, methanol, isopropanol, butanol, pentanol, cyclohexanol, ethylene glycol, and combinations thereof.

According to the present disclosure, the monomer may be selected from the group consisting of methyl acrylate, methyl methacrylate, butyl methacrylate, stearyl methacrylate, glycidyl methacrylate, and combinations thereof.

According to the present disclosure, the binder may be selected from the group consisting of methyltrimethoxysilane, tetramethoxysilane, tetraethoxysilane, tetraisopropoxysilane, tetrabutoxysilane, pentaerythritol triacrylate, phenyl methyldimethoxysilane, 3-mercaptopropyl trimethoxysilane (MPTMS), and combinations thereof.

According to the present disclosure, the first solvent and the second solvent are independently selected from the group consisting of cyclohexane, hexane, heptane, dimethyl sulfide, acetone, dichloromethane, toluene, diethyl ether, and combinations thereof.

According to the present disclosure, the base polymer may be present in an amount ranging from 1 wt % to 30 wt %, based on the total weight of the third mixture.

According to the present disclosure, the initiator may be present in an amount ranging from 1 wt % to 5 wt %, based on the total weight of the third mixture.

According to the present disclosure, the surfactant may be present in an amount ranging from 0.1 wt % to 5 wt %, based on the total weight of the third mixture.

According to the present disclosure, the alcohol may be present in an amount ranging from 1 wt % to 10 wt %, based on the total weight of the third mixture.

According to the present disclosure, the monomer may be present in an amount ranging from 0.1 wt % to 5 wt %, based on the total weight of the third mixture.

According to the present disclosure, the binder may be present in an amount ranging from 0.1 wt % to 5 wt %, based on the total weight of the third mixture.

According to the present disclosure, the conductive microspheres may be present in an amount ranging from 1 wt % to 10 wt %, based on the total weight of the third mixture.

The present disclosure also provides an anisotropic conductive film, which is produced by the aforesaid method.

According to the present disclosure, a ratio of resistance in a direction parallel to the anisotropic conductive film to that in a direction perpendicular to the anisotropic conductive film after pressing and heating, which is in decimal form, is more than one million.

Moreover, the present disclosure provides a composition for forming an anisotropic conductive film, which includes:
  a base polymer;
  10 wt % to 35 wt % of a monomer;
  5 wt % to 20 wt % of a binder;
  1 wt % to 5 wt % of an initiator;
  0.5 wt % to 5 wt % of a surfactant; and
  1 wt % to 10 wt % of conductive microspheres, based on the total weight of the base polymer.

The details of the components (i.e., the base polymer, the monomer, the binder, the initiator, the surfactant, and the alcohol) of the composition are generally the same as those described above.

According to the present disclosure, the conductive microspheres may be selected from the group consisting of polymer core-metal shell microspheres and solid metal microspheres.

The present disclosure will be further described by way of the following examples. However, it should be understood that the following examples are intended solely for the purpose of illustration and should not be construed as limiting the present disclosure in practice.

EXAMPLES

Preparation of Anisotropic Conductive Film

Each of the anisotropic conductive films of Examples 1 to 28 (abbreviated as EX1 to EX28) was prepared using the corresponding recipe shown in Tables 1 to 2 and according to the procedures described below.

First, a base polymer and benzoyl peroxide (BPO) (serving as an initiator) were added to a solvent, followed by stirring with a magnetic stirrer at different conditions, i.e., at a temperature of 70° C. for 60 minutes when cyclohexane was used as a solvent, and at a temperature of 100° C. for 60 minutes when toluene was used as a solvent, so as to obtain a first mixture. The resultant first mixture was maintained at the aforesaid specific temperature.

In addition, Ag-plated poly(methyl methacrylate) (PMMA) microspheres (i.e., conductive microspheres) were dispersed in isopropyl alcohol (IPA) or a solvent containing sodium dodecyl sulfate (SDS)(serving as a surfactant), so as to obtain a second mixture.

Next, at least one or none of a monomer and a binder, and the second mixture were added to the first mixture, followed by being left standing for reaction to proceed at the aforesaid specific temperature for a time period ranging from 15 minutes to 120 minutes, so as to obtain a third mixture. The resultant third mixture was dropped on a carrying paper, and was subjected to doctor-blade coating (DBC) using techniques well-known to those skilled in the art, followed by infrared drying, so as to obtain an anisotropic conductive film.

TABLE 1

| | Solvent | | Base polymer | | Monomer | |
|---|---|---|---|---|---|---|
| | Type | Volume (mL) | type | Weight (g) | Type | Volume (μL) |
| EX1 | Toluene | 500 | PMMA grains | 65 | — | — |
| EX2 | Toluene | 500 | PMMA grains | 65 | — | — |
| EX3 | Toluene | 500 | Ethylene vinyl acetate (EVA) grains | 6.5 | — | — |
| | | | PMMA grains | 58.5 | | |
| EX4 | Toluene | 500 | EVA grains | 21.7 | — | — |
| EX5 | Toluene | 500 | EVA grains | 21.7 | Methyl acrylate (MA) | 50 |
| EX6 | Cyclohexane | 500 | EVA grains | 38.95 | — | — |
| EX7 | Cyclohexane | 500 | EVA grains | 19.5 | — | — |
| EX8 | Cyclohexane | 500 | EVA grains | 19.5 | — | — |
| EX9 | Cyclohexane | 500 | EVA grains | 19.5 | — | — |
| EX10 | Cyclohexane | 500 | EVA grains | 27.5 | — | — |
| EX11 | Cyclohexane | 500 | EVA grains | 27.5 | — | — |
| EX12 | Cyclohexane | 500 | EVA grains | 20 | MA | 50 |
| EX13 | Cyclohexane | 500 | EVA grains | 20 | Glycidyl methacrylate (GMA) | 50 |
| EX14 | Cyclohexane | 500 | EVA grains | 20 | MA | 50 |
| EX15 | Cyclohexane | 500 | EVA grains | 20 | MA | 50 |
| EX16 | Cyclohexane | 500 | EVA grains | 20 | MA | 50 |
| EX17 | Cyclohexane | 500 | EVA grains | 20 | MA | 50 |
| EX18 | Cyclohexane | 500 | EVA grains | 20 | MA | 50 |
| EX19 | Cyclohexane | 500 | EVA grains | 20 | MA | 50 |
| EX20 | Cyclohexane | 500 | EVA grains | 20 | MA | 50 |
| EX21 | Cyclohexane | 500 | EVA grains | 20 | MA | 50 |
| EX22 | Cyclohexane | 500 | EVA grains | 20 | MA | 50 |
| EX23 | Cyclohexane | 500 | EVA grains | 20 | MA | 50 |
| EX24 | Cyclohexane | 500 | EVA grains | 20 | MA | 50 |
| EX25 | Cyclohexane | 500 | EVA grains | 20 | MA | 50 |
| EX26 | Cyclohexane | 500 | EVA grains | 20 | MA | 50 |
| EX27 | Cyclohexane | 500 | EVA grains | 20 | MA | 50 |
| EX28 | Cyclohexane | 500 | EVA grains | 20 | MA | 50 |

"—": Not added.

TABLE 2

| | Binder | | BPO | Ag-plated PMMA |
|---|---|---|---|---|
| | Type | Volume (μL) | Weight (g) | microspheres Weight (g) |
| EX1 | Pentaerythritol triacrylate (PETA) | 50 | 1.3 | 3.25 |
| | 3-mercaptopropyl trimethoxysilane (MPTMS) | 5 | | |
| EX2 | PETA | 50 | — | — |
| | MPTMS | 5 | | |
| EX3[a] | PETA | 50 | — | 0.033 |
| | MPTMS | 5 | | |
| EX4[a] | PETA | 50 | 0.85 | 0.65 |
| EX5 | MPTMS | 5 | 0.85 | — |
| EX6[a] | PETA | 50 | 1.55 | 1.2 |
| EX7 | PETA | 50 | 0.8 | 0.6 |
| EX8[b] | — | — | 0.8 | 0.6 |
| EX9[c] | — | — | 0.8 | 0.6 |
| EX10[c] | — | — | 1.1 | 0.85 |
| EX11[c] | PETA | 5 | 1.1 | 0.85 |
| EX12[c] | — | — | 0.8 | 0.6 |
| EX13[c] | — | — | 0.8 | 0.6 |
| EX14[c] | MPTMS | 25 | 0.8 | 0.6 |
| EX15[c] | MPTMS | 25 | 0.8 | 0.6 |

TABLE 2-continued

| Type | Binder Volume (μL) | BPO Weight (g) | Ag-plated PMMA microspheres Weight (g) |
|---|---|---|---|
| EX16[c] | MPTMS | 25 | 0.8 | 0.6 |
| EX17[c] | MPTMS | 25 | 0.8 | 0.6 |
| EX18[c] | MPTMS | 25 | 0.8 | 0.6 |
| EX19[c] | MPTMS | 25 | 0.8 | 0.6 |
| EX20[c] | MPTMS | 25 | 0.8 | 0.6 |
| EX21[c] | MPTMS | 25 | 0.8 | 0.6 |
| EX22 | MPTMS | 25 | 0.8 | — |
| EX23 | MPTMS | 25 | 0.8 | — |
| EX24 | MPTMS | 25 | — | — |
| EX25[c] | MPTMS | 25 | 0.8 | 0.6 |
| EX26[c] | MPTMS | 25 | 0.8 | 0.6 |
| EX27[c] | MPTMS | 25 | 0.8 | 0.6 |
| EX28[c] | MPTMS | 25 | 0.8 | 0.6 |

[a]The Ag-plated PMMA microspheres were dispersed in 0.5 mL of isopropyl alcohol (IPA).
[b]The Ag-plated PMMA microspheres were dispersed in 1 mL of a hexane solution containing 1.5% sodium dodecyl sulfate (SDS).
[c]The Ag-plated PMMA microspheres were dispersed in 1 mL of a cyclohexane solution containing 1.5% SDS.
"—": Not added.

Property Evaluation

A. Measurement of Vertical and Horizontal Resistances

The vertical and horizontal resistances of the anisotropic conductive film was measured according to according to the following procedures.

First, the anisotropic conductive film of the respective one of EX19 and EX21 was subjected to measurement using two overlapped printed circuit boards (PCBs) with predefined pads (numbered from 1 to 10) having a minimum width of 254 μm. In order to measure the vertical resistance, a measurement of the pads having the same pad number and belonging to two PCBs (one on top of another; between which the anisotropic conductive film was sandwiched) was carried out. In order to measure the horizontal resistance, a measurement of two adjacent pads of the same PCB was carried out. A pressure of 5 bar exerted upon the top PCB by a compressed air piston, and the two PCBs were then heated at 200° C. The whole setup was kept for 10 minutes. Thereafter, the two PCBs were released, and the resistance was measured by an ohmmeter (Agilent, U1272A).

The results of the measurement of vertical resistance are shown in Table 3. It can be seen from Table 3 that except for the pad number 8 and number 9, which were likely to be misaligned, all other vertical resistance values of EX19 and EX21 were less than 120Ω. In particular, for the anisotropic conductive film of EX21, the vertical resistance values measured from the pad numbers 1 to 6, and 10 were less than 1Ω, which was a remarkably low value.

TABLE 3

| | Pressure (bar) | Resistance (Ω) of contact pads with same pad number | | | | | | | | | |
|---|---|---|---|---|---|---|---|---|---|---|---|
| | | 1 | 2 | 3 | 4 | 5 | 6 | 7 | 8 | 9 | 10 |
| EX19 | 5 | 0.42 | 0.28 | 2.7 | 21.6 | 30 | 10 | 103 | O.L | O.L | 4.5 |
| EX21 | 5 | 0.17 | 0.16 | 0.82 | 0.14 | 0.15 | 0.13 | 118 | O.L | O.L | 0.29 |

"O.L": Over loaded (i.e., the vertical resistance was too high to measure).

In addition, the horizontal resistance of the anisotropic conductive film of each of EX19 and EX21 was too high to measure.

Based on the aforesaid results, the applicant surprisingly found that a ratio of resistance in a direction parallel to the anisotropic conductive film to that in a direction perpendicular to the anisotropic conductive film after pressing and heating (in decimal form) is more than one million. As such, the applicant deem that the anisotropic conductive film produced by the method of the present disclosure has great potential for applications in flat-panel display as well as in smart cards.

B. Morphological Analysis

The anisotropic conductive film of each of EX19 and EX21 was subjected to morphological analysis using an optical microscope with an objective lens having a magnification of 50× and an eyepiece having a magnification of 10× (MBL 3300, Kruss).

Figure 2:
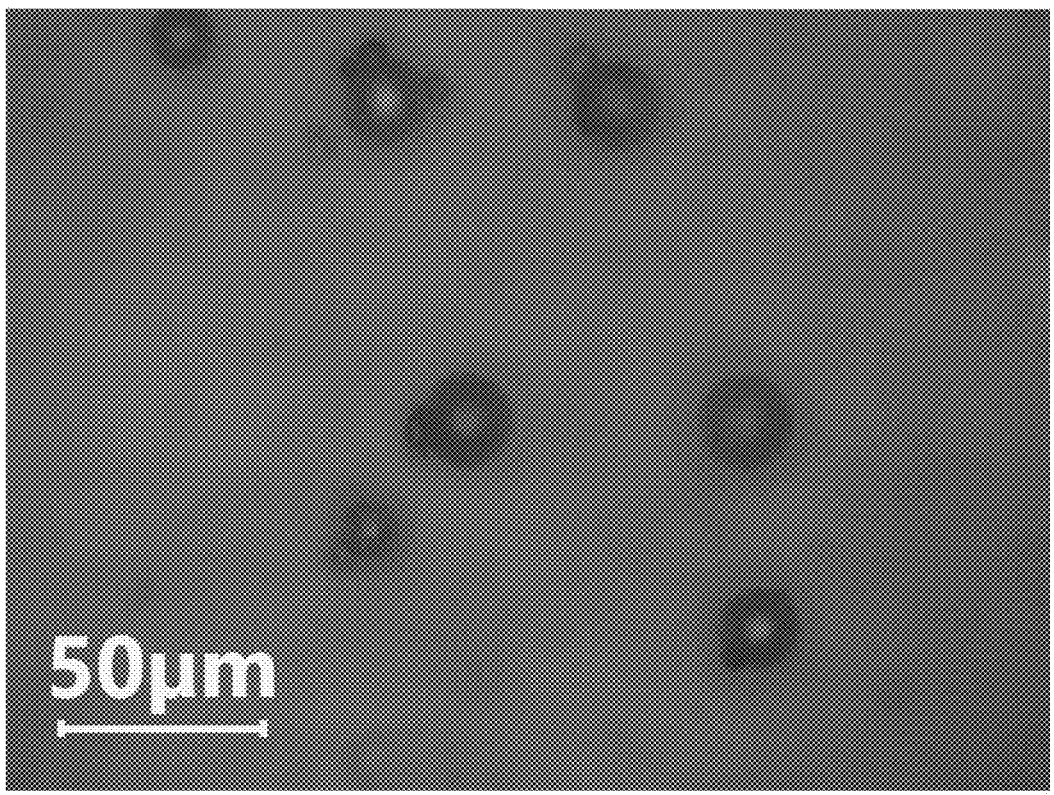
FIG. 2 shows the morphological observation result of the anisotropic conductive film of Example 21, infra.

The results are shown in FIGS. 1 to 2. It can be seen from FIGS. 1 to 2 that the Ag-plated PMMA microspheres having a particle size ranging from 10 μm to 20 μm were visibly dispersed in the base polymer film. When the anisotropic conductive film was sandwiched between a top and a bottom metal contact, the Ag-plated PMMA microspheres connected electrically the two metal contacts with a resistance as low as 1Ω (see Table 3). Since the Ag-plated PMMA microspheres do not adhere one with other, no electrical lateral conductivity is observed for the two metal contacts in the same plane.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for producing an anisotropic conductive film, comprising:
   (a) mixing a base polymer with an initiator and a first solvent, so as to obtain a first mixture;
   (b) dispersing conductive microspheres, which are selected from the group consisting of polymer core-metal shell microspheres and solid metal microspheres, in an alcohol or a second solvent containing a surfactant, so as to obtain a second mixture;
   (c) mixing the first mixture obtained in step (a) with a monomer, a binder, and the second mixture obtained in step (b), so as to obtain a third mixture; and
   (d) laminating the third mixture on a carrying film, followed by drying, so as to obtain the anisotropic conductive film.

2. The method according to claim 1, wherein the base polymer is selected from the group consisting of ethylene vinyl acetate (EVA), low density polyethylene (LDPE), high density polyethylene (HDPE), poly(methyl methacrylate) (PMMA), and combinations thereof.

3. The method according to claim 1, wherein the initiator is selected from the group consisting of potassium persulfate, benzoyl peroxide (BPO), azobisisobutyronitrile, 2,2'-azobis(2-methylbutyronitrile), dicumyl peroxide, di-tert-butyl peroxide, tert-butyl hydroperoxide, and combinations thereof.

4. The method according to claim 1, wherein the surfactant is selected from the group consisting of sodium dodecyl sulfate (SDS), polyethylene glycol p-(1,1,3,3-tetramethylbutyl)-phenyl ether, polyvinylpyrrolidone (PVP), dioctyl sodium sulfosuccinate (DSS), alkylbenzene sulfonates, nonoxynol-9, polysorbate, poloxamers, tergitol, antarox, and combinations thereof.

5. The method according to claim 1, wherein the alcohol is selected from the group consisting of ethanol, methanol, isopropanol, butanol, pentanol, cyclohexanol, ethylene glycol, and combinations thereof.

6. The method according to claim 1, wherein the monomer is selected from the group consisting of methyl acrylate, methyl methacrylate, butyl methacrylate, stearyl methacrylate, glycidyl methacrylate, and combinations thereof.

7. The method according to claim 1, wherein the binder is selected from the group consisting of methyltrimethoxysilane, tetramethoxysilane, tetraethoxysilane, tetraisopropoxysilane, tetrabutoxysilane, pentaerythritol triacrylate, phenyl methyldimethoxysilane, 3-mercaptopropyl trimethoxysilane (MPTMS), and combinations thereof.

8. The method according to claim 1, wherein the first solvent and the second solvent are independently selected from the group consisting of cyclohexane, hexane, heptane, dimethyl sulfide, acetone, dichloromethane, toluene, diethyl ether, and combinations thereof.

9. The method according to claim 1, wherein the base polymer is present in an amount ranging from 1 wt % to 30 wt %, based on the total weight of the third mixture.

10. The method according to claim 1, wherein the initiator is present in an amount ranging from 1 wt % to 5 wt %, based on the total weight of the third mixture.

11. The method according to claim 1, wherein the surfactant is present in an amount ranging from 0.1 wt % to 5 wt %, based on the total weight of the third mixture.

12. The method according to claim 1, wherein the alcohol is present in an amount ranging from 1 wt % to 10 wt %, based on the total weight of the third mixture.

13. The method according to claim 1, wherein the monomer is present in an amount ranging from 0.1 wt % to 5 wt %, based on the total weight of the third mixture.

14. The method according to claim 1, wherein the binder is present in an amount ranging from 0.1 wt % to 5 wt %, based on the total weight of the third mixture.

15. The method according to claim 1, wherein the conductive microspheres are present in an amount ranging from 1 wt % to 10 wt %, based on the total weight of the third mixture.

16. An anisotropic conductive film, which is produced by a method according to claim 1, wherein a ratio of resistance in a direction parallel to the anisotropic conductive film to that in a direction perpendicular to the anisotropic conductive film after pressing and heating, which is in decimal form, is more than one million.

17. A composition for forming an anisotropic conductive film, comprising:
   a base polymer;
   10 wt % to 35 wt % of a monomer;
   5 wt % to 20 wt % of a binder;
   1 wt % to 5 wt % of an initiator;
   0.5 wt % to 5 wt % of a surfactant; and
   1 wt % to 10 wt % of conductive microspheres, based on the total weight of the base polymer, wherein the surfactant is selected from the group consisting of sodium dodecyl sulfate (SDS), polyethylene glycol p-(1,1,3,3-tetramethylbutyl)-phenyl ether, polyvinylpyrrolidone (PVP), dioctyl sodium sulfosuccinate (DSS), alkylbenzene sulfonates, nonoxynol-9, polysorbate, poloxamers, tergitol, antarox, and combinations thereof.

18. The composition according to claim 17, wherein the base polymer is selected from the group consisting of ethylene vinyl acetate (EVA), low density polyethylene (LDPE), high density polyethylene (HDPE), poly(methyl methacrylate) (PMMA), and combinations thereof.

19. The composition according to claim 17, wherein the monomer is selected from the group consisting of methyl acrylate, methyl methacrylate, butyl methacrylate, stearyl methacrylate, glycidyl methacrylate, and combinations thereof.

20. The composition according to claim 17, wherein the binder is selected from the group consisting of methyltrimethoxysilane, tetramethoxysilane, tetraethoxysilane, tetraisopropoxysilane, tetrabutoxysilane, pentaerythritol triacrylate, phenyl methyldimethoxysilane, 3-mercaptopropyl trimethoxysilane (MPTMS), and combinations thereof.

21. The composition according to claim 17, wherein the initiator is selected from the group consisting of potassium persulfate, benzoyl peroxide, azobisisobutyronitrile, 2,2'-azobis(2-methylbutyronitrile), dicumyl peroxide, di-tert-butyl peroxide, tert-butyl hydroperoxide, and combinations thereof.

22. The composition according to claim 17, wherein the conductive microspheres are selected from the group consisting of polymer core-metal shell microspheres and solid metal microspheres.

* * * * *